(12) United States Patent  (10) Patent No.: US 8,739,056 B2
Palmer et al.  (45) Date of Patent: May 27, 2014

(54) SYSTEMS AND METHODS FOR DISPLAYING A DYNAMIC LIST OF VIRTUAL OBJECTS WHEN A DRAG AND DROP ACTION IS DETECTED

(75) Inventors: Alan Palmer, Lindon, UT (US); Preston Rowlette, Cottonwood Heights, UT (US); David Watson, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 360 days.

(21) Appl. No.: 12/967,828

(22) Filed: Dec. 14, 2010

(65) Prior Publication Data

US 2012/0151363 A1 Jun. 14, 2012

(51) Int. Cl.
*G06F 3/048* (2013.01)

(52) U.S. Cl.
USPC .......................................... 715/769; 715/736

(58) Field of Classification Search
USPC .................................................. 715/736, 769
See application file for complete search history.

(56) References Cited

U.S. PATENT DOCUMENTS

| | | | | |
|---|---|---|---|---|
| 5,745,111 | A * | 4/1998 | Cline et al. | 715/769 |
| 7,650,575 | B2 * | 1/2010 | Cummins et al. | 715/769 |
| 7,979,854 | B1 * | 7/2011 | Borole et al. | 717/172 |
| 2002/0054113 | A1 * | 5/2002 | Conrad et al. | 345/764 |
| 2003/0182471 | A1 * | 9/2003 | Harris et al. | 709/328 |
| 2005/0086197 | A1 * | 4/2005 | Boubez et al. | 707/1 |
| 2005/0262076 | A1 * | 11/2005 | Voskuil | 707/8 |
| 2007/0234226 | A1 * | 10/2007 | Szeto | 715/769 |
| 2008/0295012 | A1 * | 11/2008 | Sloo et al. | 715/769 |
| 2009/0259959 | A1 * | 10/2009 | Grotjohn et al. | 715/769 |
| 2009/0276701 | A1 * | 11/2009 | Nurmi | 715/702 |
| 2010/0011310 | A1 * | 1/2010 | Rainisto | 715/769 |

OTHER PUBLICATIONS

Screen shot of PRVM Symantec Management Console (1 pg.), Feb. 22, 2010 taken from screen.
Website: http://en.wikipedia.org/wiki/Drag-and-drop, *Drag-and-drop*, Wikipedia, Feb. 8, 2011 (3 pgs.).

* cited by examiner

*Primary Examiner* — Omar Abdul-Ali
*Assistant Examiner* — Anil Bhargava
(74) *Attorney, Agent, or Firm* — Holland & Hart LLP

(57) ABSTRACT

A computer-implemented method to display a dynamic list of virtual objects is described. An activity relating to a management object is detected. A dynamic list of virtual objects is displayed on a screen. The virtual objects are possible recipients of the management object. A determination is made as to whether the activity relating to the management object is terminated. The display of the dynamic list of virtual objects on the screen is terminated when the activity relating to the management object is terminated.

17 Claims, 13 Drawing Sheets

SYSTEMS AND METHODS FOR DISPLAYING A DYNAMIC LIST OF VIRTUAL OBJECTS WHEN A DRAG AND DROP ACTION IS DETECTED

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Computing systems may include a screen to display information to a user. The size of the screen may limit the amount of information that may be displayed efficiently to the user. As a result, the effective use of the space on a screen may be a difficult design challenge. On the one hand, the desire exists to display as much data and as many controls as possible on the screen in order to minimize the need for hidden commands and scrolling. On the other hand, however, excessive data displayed on a screen may be poorly organized and/or confusing to the user. As a result, benefits may be realized by providing improved systems and methods for automatically displaying a dynamic list of virtual objects when a particular action is detected. In particular, benefits may be realized by providing improved systems and methods for displaying a dynamic list of virtual objects when a drag and drop action is detected.

SUMMARY

According to at least one embodiment, a computer-implemented method to display a dynamic list of virtual objects is described. An activity relating to a management object is detected. A dynamic list of virtual objects is displayed on a screen. The virtual objects are possible recipients of the management object. A determination is made as to whether the activity relating to the management object is terminated. The display of the dynamic list of virtual objects on the screen is terminated when the activity relating to the management object is terminated.

In one embodiment, the activity relating to the management object may include a drag and drop action. The dynamic list of virtual objects may include a list of computing devices that are possible recipients of the management object. In one configuration, the management object may be a job to be implemented by a virtual object. The management object may be a policy to be implemented by a virtual object. Further, the management object may be a software package to be downloaded by a virtual object.

In one example, the activity relating to the management object may include grabbing the management object via an electronic pointing device. The dynamic list of virtual objects may include the virtual objects previously accessed by a user. In one configuration, a section associated with a management object may be pushed over to display the dynamic list of virtual objects.

A computing device configured to display a dynamic list of virtual objects is also described. The computing device may include a processor and memory in electronic communication with the processor. The computing device may further include a management console configured to detect an activity relating to a management object, and display a dynamic list of virtual objects on a screen. The virtual objects may be possible recipients of the management object. The management console may also be configured to determine when the activity relating to the management object is terminated, and terminate the display of the dynamic list of virtual objects on the screen when the activity relating to the management object is terminated.

A computer-program product for displaying a dynamic list of virtual objects is also described. The computer-program product may include a computer-readable medium having instructions thereon. The instructions may include code programmed to detect an activity relating to a management object, and code programmed to display a dynamic list of virtual objects on a screen. The virtual objects may be possible recipients of the management object. The instructions may further include code programmed to determine when the activity relating to the management object is terminated, and code programmed to terminate the display of the dynamic list of virtual objects on the screen when the activity relating to the management object is terminated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
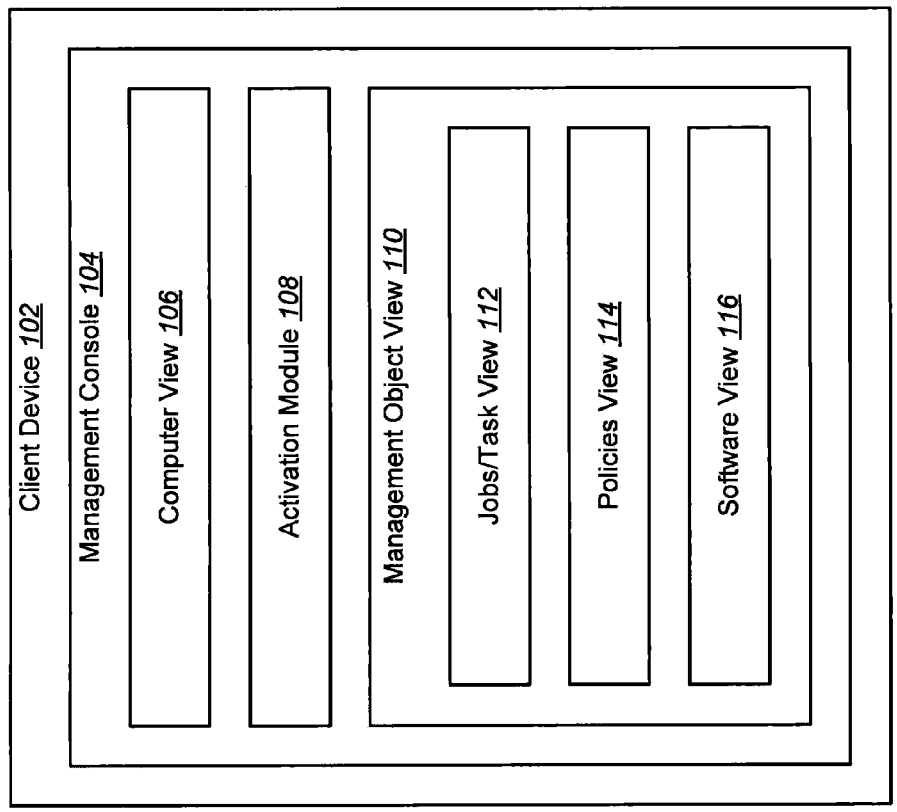
FIG. 1 is a block diagram illustrating one embodiment of a client device that may implement the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Screen real estate for a computing device with a display may refer to the amount of space available on the display for an application to provide output. Typically, the effective use of screen real estate is a difficult design challenge because of the desire to have as much data and as many controls as possible visible on the screen to minimize the need for hidden commands and scrolling. At the same time, however, excessive information may be poorly organized or confusing. As a result, effective screen layouts may be used with the appropriate use of white space.

Applications that run on a computing device may include a user interface. The user may interact with virtual objects in an application via the user interface. For example, the user may use an electronic pointing device (e.g., a mouse) to select a particular virtual object. The user may move the object from one location to another using a drag and drop action. In computer graphical user interfaces (GUIs), drag and drop may be the action of clicking on a virtual object and dragging it to a different location or onto another virtual object. In one embodiment, the basic sequence involved in a drag and drop action includes, but is not limited to, pressing (and holding down), a button on the electronic pointing device to "grab" the virtual object, dragging the virtual object by moving the electronic pointing device to the desired location, and dropping the virtual object by releasing the button on the electronic pointing device.

In one example, a design problem may arise when the target location or target object is hidden under other objects. As a result, the user must stop dragging the source object and ensure that both the source object and the target object (or target location) are visible and then start the drag and drop action again. Because user interface screen real estate is limited, having multiple sets of related objects available to drag and drop on one another on the same screen (or display) is a difficult design problem to overcome. In addition, if there are multiple object types that can be related through a drag and drop action, moving to those sections of objects may be hard to understand or follow for users.

The present systems and methods provide a user interface (or other interaction model) that allows users to select an interface representation of management objects. In one embodiment, grabbing and dragging (i.e., drag action) a management object from a first list of management objects may open (or display) a second list of related objects next to the first list of management objects. The second list of objects may be directly related to the original management objects in the first list. When a user drops the dragged management object (i.e., drop action) on a related object displayed on the second list of objects, the second list of related objects may be removed from the screen. In other words, the second list of related objects may no longer be displayed to the user after the drag and drop action is completed.

FIG. 1 is a block diagram illustrating one embodiment of a client device 102 that may implement the present systems and methods. In one configuration, the client device 102 may be a personal computer (PC), a laptop, a server, a personal digital assistant (PDA), or any other type of computing device. In one embodiment, the client device 102 may be used by a network administrator to manage multiple computing devices in a network In one example, the client device 102 may include a management console 104. The management console 104 may be used to manage computing devices that are part of the network. In one configuration, the management console 104 may be a user interface for the network administrator. The console 104 may provide a computer view 106 and a management object view 110. In addition, the management console 104 may include an activation module 108. The activation module 108 may detect certain actions caused by the user via the management console 104. Details regarding the activation module 108 will be described below.

In one embodiment, the computer view 106 may provide the user with information regarding some or all of the computing devices included in the network that are managed by the management console 104. The management object view 110 may provide the user with information regarding some or all of the management objects that may be implemented on the computing devices within the network. Management objects may include, but are not limited to, jobs/tasks, policies, and software. As a result, the management object view 110 may provide the user with a jobs/tasks view 112, a policies view 114, and a software view 116. Each of these views 112, 114, 116 may provide information to the user regarding a particular management object.

Figure 2:
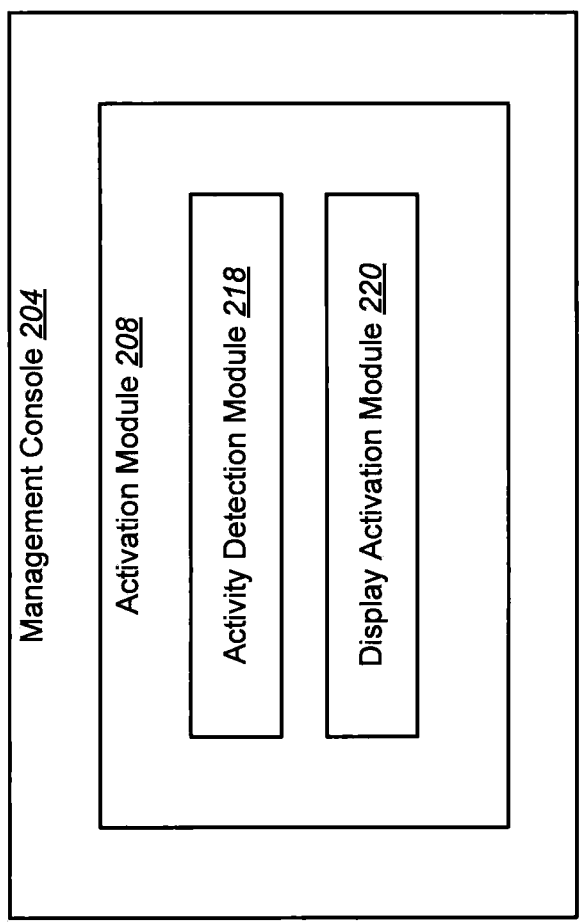
FIG. 2 is a block diagram illustrating one embodiment of an activation module included in a management console.

FIG. 2 is a block diagram illustrating one embodiment of an activation module 208 included in a management console 204. In one configuration, the activation module 208 may include an activity detection module 218 and a display activation module 220. In one example, the activity detection module 218 may detect certain actions originated by the user via the management console 204. For example, the activity detection module 218 may detect when the user initiates a drag and drop action for a management object. In particular, the activity detection module 218 may detect when the user grabs a virtual management object on the management console 204 via an electronic pointing device. The display activation module 220 may activate a display of virtual objects when activity is detected by the detection module 218. For example, when the activity detection module 218 detects a grabbing action of a management object by the user, the display activation module 220 may cause a list of computing devices to be displayed. The user may then drag and drop the grabbed management object onto one or more displayed computing devices. When the detection module 218 detects that the action has been terminated (i.e., the user has ceased the drag and drop action), the display activation module 220 may terminate the display of the list of computing devices. As a result, the activation module 218 may cause a list of virtual objects to be displayed when an action is detected and remove the list of virtual objects from the screen when the action is terminated. Thus, the activation module 208 increases the efficiency of the screen real estate by only displaying the list of virtual objects when the action is detected.

Figure 3:
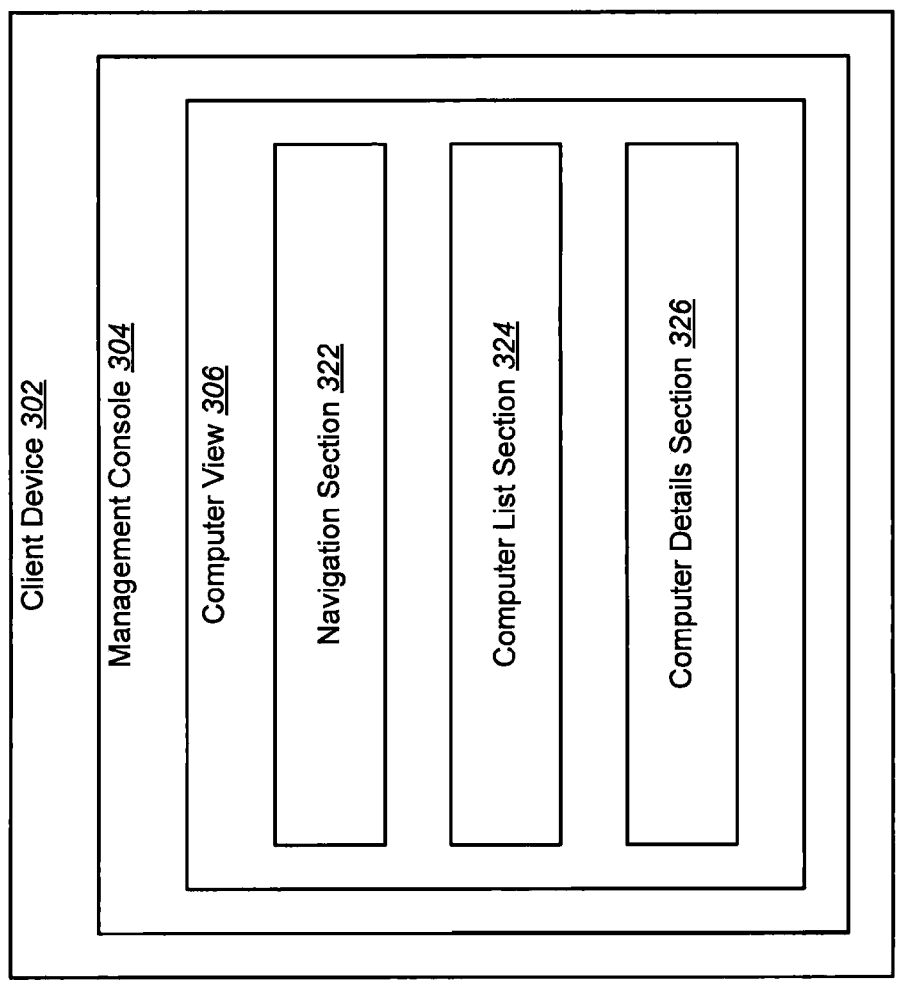
FIG. 3 is a block diagram illustrating one embodiment of a computer view provided by the management console on client device.

FIG. 3 is a block diagram illustrating one embodiment of a computer view 306 provided by a management console 304 on client device 302. In one example, the computer view 306 may include a navigation section 322, a computer list section 324, and a computer details section 326.

In one configuration, the navigation section 322 may allow the user to specify the types of computers to include in the computer list section 324. For example, the user may select an "all computers" option in the navigation section 322. With this selected option, the computer list section 324 may list all the computers included in the network. The navigation section 322 may also allow the user to search for a particular computer or group of computers. The computer list section 324 may then display the list of computers in the network that satisfy the criteria specified in the search. In one example, the user may select a computing device listed in the computer list section 324. The computer details section 326 may display details regarding the selected computing device. The details may include, but are not limited to, the domain name, the server, the resource name, the operating system (OS) installed on the computing device, and the like. The details may also include a list of management objects that have been previously installed (or are scheduled to be installed) on the selected computing device. As previously stated, management object may include jobs/tasks, software, and policies.

Figure 4:
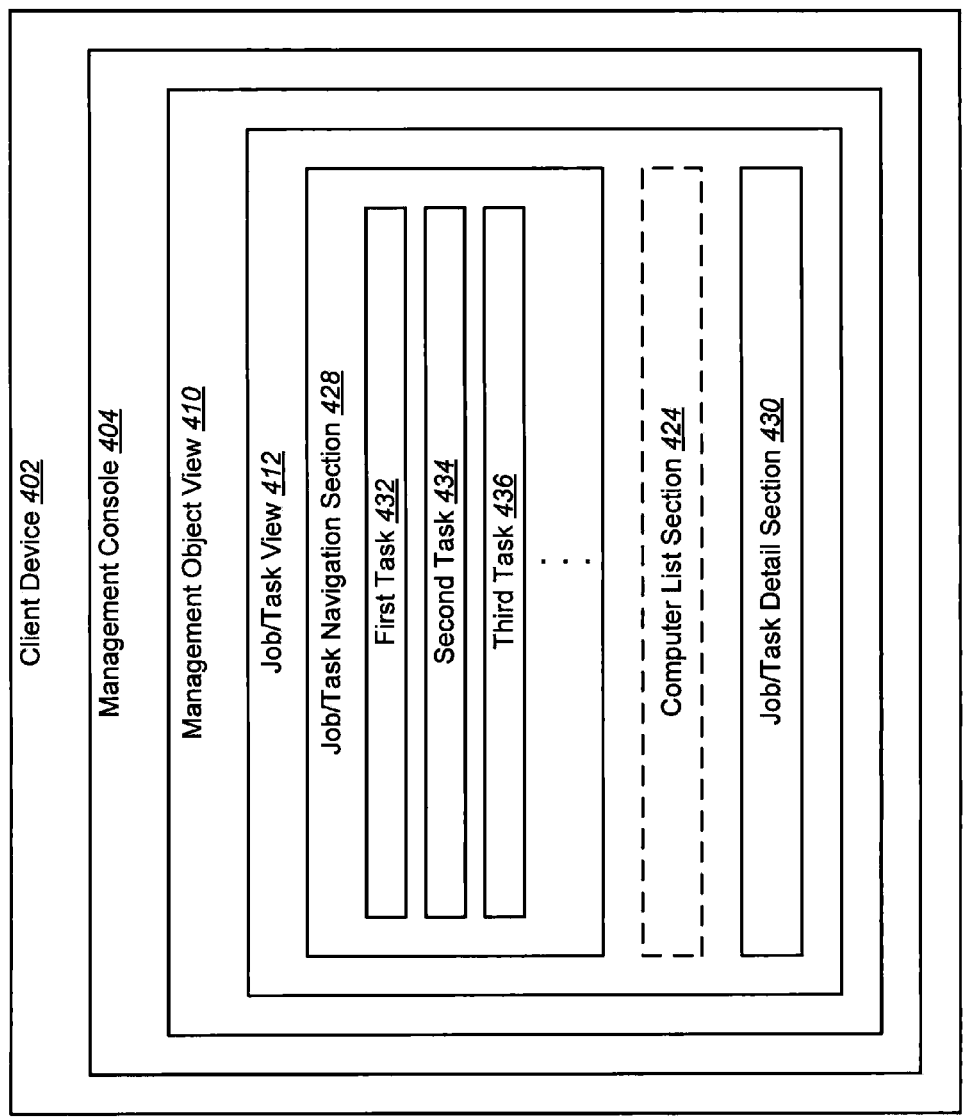
FIG. 4 is a block diagram illustrating one embodiment of a job/task view provided as part of a management object view via a management console installed on a client device.

FIG. 4 is a block diagram illustrating one embodiment of a job/task view 412 provided as part of a management object view 410 via a management console 404 installed on a client device 402. In one configuration, the job/task view 412 may include a job/task navigation section 428 and a job/task detail section 430. In one embodiment, a computer list section 424 may be displayed within the job/task view 412, as will be described below.

In one configuration, the job/task navigation section 428 may include a list of tasks 432, 434, 436 that may be applied to one or more computing devices. The user may select a task from the job/task navigation section 428. Details regarding the selected task may be displayed in the job/task detail section 430. In one embodiment, the user may select a task from the navigation section 428 by grabbing the task to initiate a drag and drop action. When the user grabs a task and initiates the drag and drop action, the computer list section 424 may be automatically displayed to the user. The user may then drag and drop the selected task onto one or more of the computing devices listed in the computer list section 424. When the drag and drop action is terminated, the computer list section 424 may disappear and not be displayed to the user. As a result, the screen real estate only includes the computer list section 424 when the drag and drop action occurs.

Figure 5:
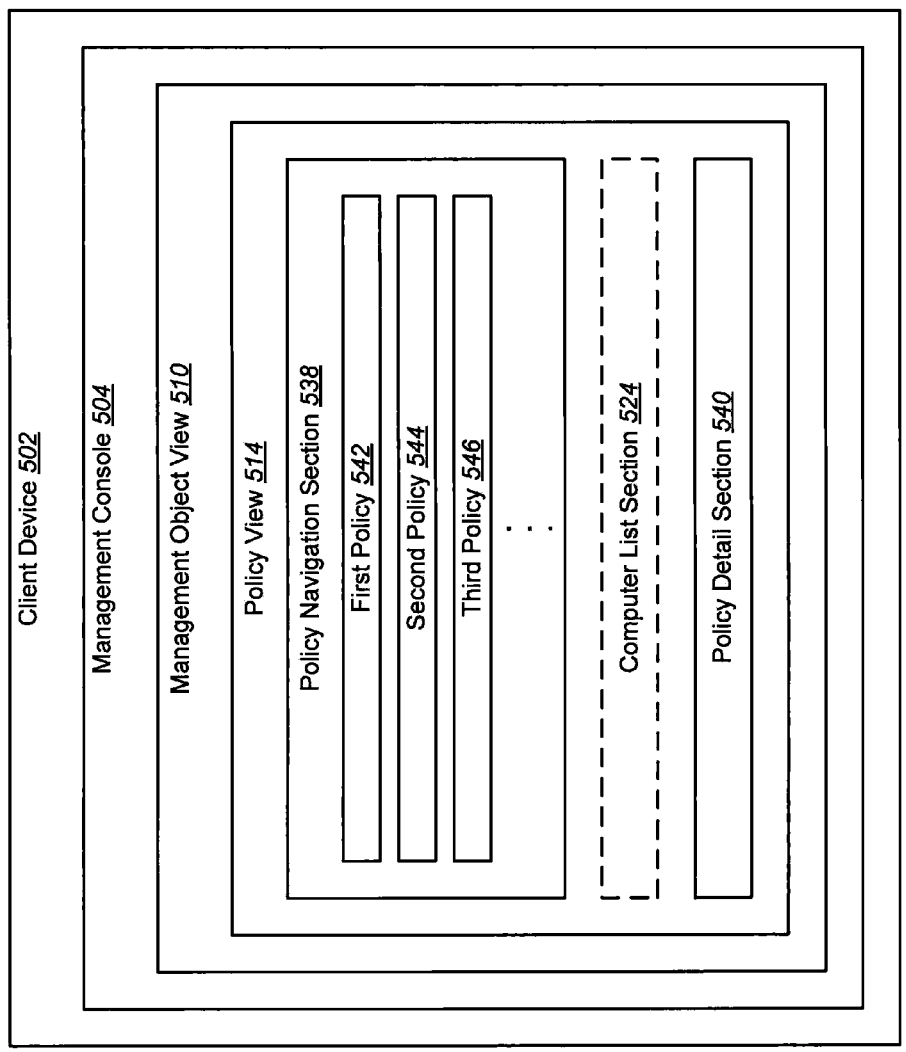
FIG. 5 is a block diagram illustrating one embodiment of a policy view provided as part of a management object view via a management console installed on a client device.

FIG. 5 is a block diagram illustrating one embodiment of a policy view 514 provided as part of a management object view 510 via a management console 504 installed on a client device 502. In one configuration, the policy view 514 may include a policy navigation section 538 and a policy detail section 540. In one embodiment, a computer list section 524 may be displayed within the policy view 514, as will be described below.

In one configuration, the policy navigation section 538 may include a list of policies 542, 544, 546 that may be applied to one or more computing devices. The user may select a policy from the policy navigation section 538. Details regarding the selected policy may be displayed in the policy detail section 540. In one embodiment, the user may select a policy from the navigation section 538 by grabbing the policy to initiate a drag and drop action. When the user grabs a policy and initiates the drag and drop action, the computer list section 524 may be automatically displayed to the user. The user may then drag and drop the selected policy onto one or more of the computing devices listed in the computer list section 524. When the drag and drop action is terminated, the computer list section 524 may disappear and not be displayed to the user. As a result, the screen real estate only includes the computer list section 524 when the drag and drop action occurs.

Figure 6:
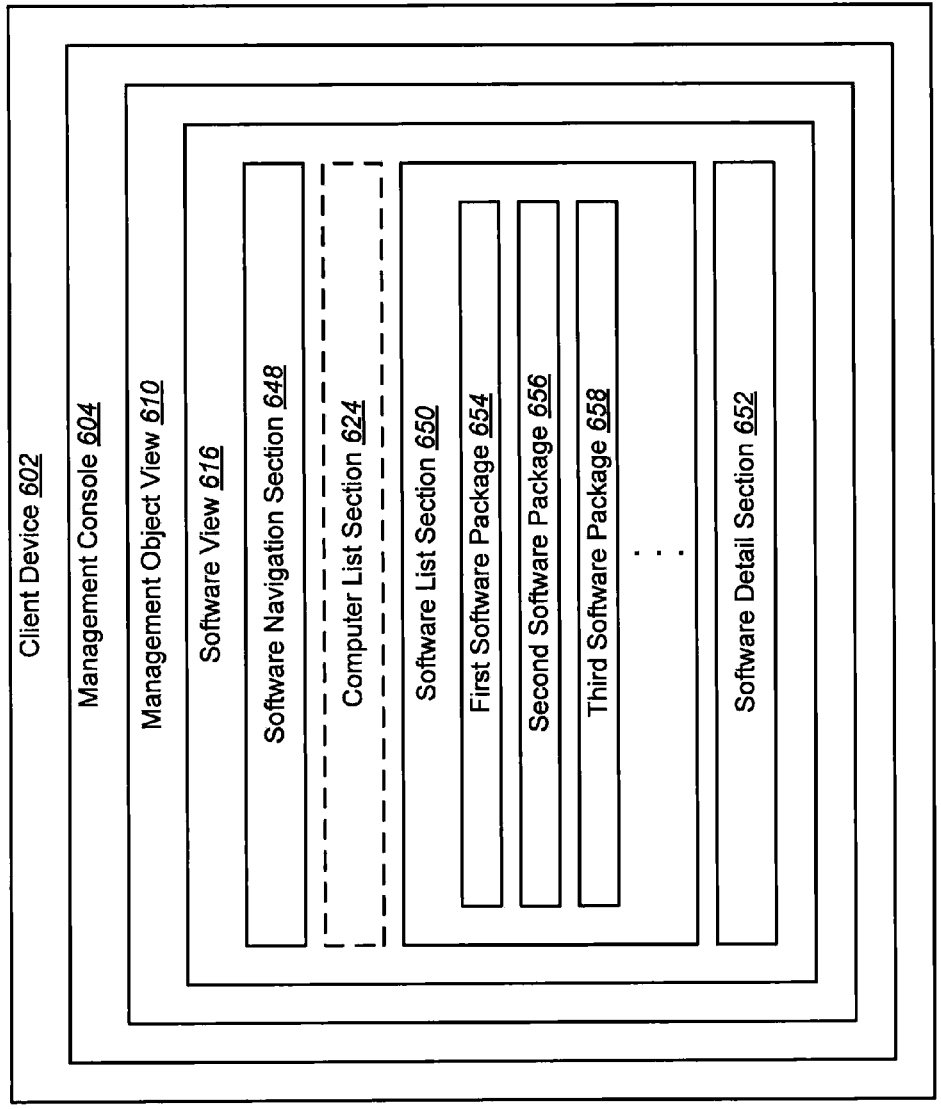
FIG. 6 is a block diagram illustrating one embodiment of a software view provided as part of a management object view via a management console installed on a client device.

FIG. 6 is a block diagram illustrating one embodiment of a software view 616 provided as part of a management object view 610 via a management console 604 installed on a client device 602. In one configuration, the software view 616 may include a software navigation section 648, a software list section 650, and a software detail section 652. In one embodiment, a computer list section 624 may be displayed within the software view 616, as will be described below.

In one configuration, the software navigation section 538 may include a list of installed software, metered software, and deliverable software. The software list section 650 may include a list of the software selected by the user in the navigation section 648. For example, if the user selects a particular type of installed software, the software satisfying this criteria may be displayed in the software list section 650. As an example, the software list section 650 may include a first software package 654, a second software package 656, a third software package 658, and the like. The software packages 654, 656, 658 may be applied to one or more computing devices listed in the computer list section 624. In one embodiment, the user may select a software package from the software list section 650. Details regarding the selected software policy may be displayed in the software detail section 652. In one embodiment, the user may select a software package from the software list section 650 by grabbing the software package to initiate a drag and drop action. When the user grabs a software package and initiates the drag and drop action, the computer list section 624 may be automatically displayed to the user. The user may then drag and drop the selected software package onto one or more of the computing devices listed in the computer list section 624. When the drag and drop action is terminated, the computer list section 624 may disappear and not be displayed to the user. As a result, the screen real estate only includes the computer list section 624 when the drag and drop action occurs.

Figure 7:
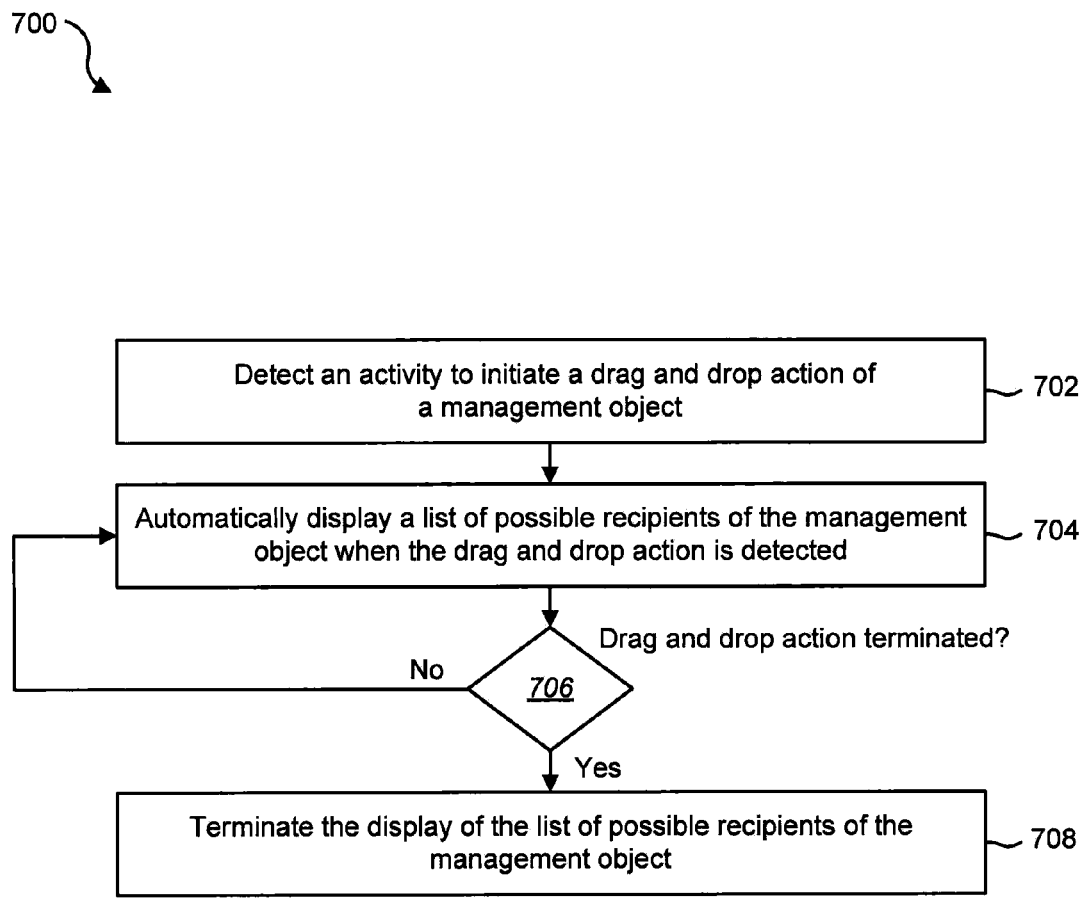
FIG. 7 is a flow diagram illustrating one embodiment of a method to automatically display a dynamic list of computing devices when a particular activity is detected on a user interface.

FIG. 7 is a flow diagram illustrating one embodiment of a method 700 to automatically display a dynamic list of computing devices when a particular activity is detected on a user interface. In one configuration, the method may be implemented by the management console 104.

In one example, an activity to initiate a drag and drop action of a management object may be detected 702. In one embodiment, the activity may be grabbing a management object to drag and drop the object onto another virtual object or drag and drop the object to a different location. Examples of management objects may be, but are not limited to, jobs, tasks, software packages, policies, workflows, automated processes, and the like. In one configuration, a list of possible recipients of the management object may be automatically displayed 704 when the activity to initiate a drag and drop action is detected. In one example, the list of possible recipients may include a list of computing devices in a network. The list may display the computing devices most recently displayed via the computer view 106. For example, a user may select the types of computing devices displayed via the computer view 106 via one or more filters. As previously explained, these devices may be displayed via the computer list section 324. When the activity initiating the drag and drop action is detected, the computer list section 324 may be automatically displayed 704 that includes the most recently listed computing devices.

In one configuration, a determination 706 may be made as to whether the drag and drop action has been terminated. For example, if the user ceases to grab a management object, the drag and drop action may be deemed to be terminated. If it is determined 704 that the drag and drop action is not terminated, the method 700 may continue to display 704 the list of possible recipients of the management object. If, however, it is determined 706 that the drag and drop action has been terminated, the display of the list of possible recipients of the management object may be terminated 708. In other words, when the drag and drop action stops, the list of computing devices may no longer be displayed on the screen of the client device 102, thus preserving screen real estate.

Figure 8:
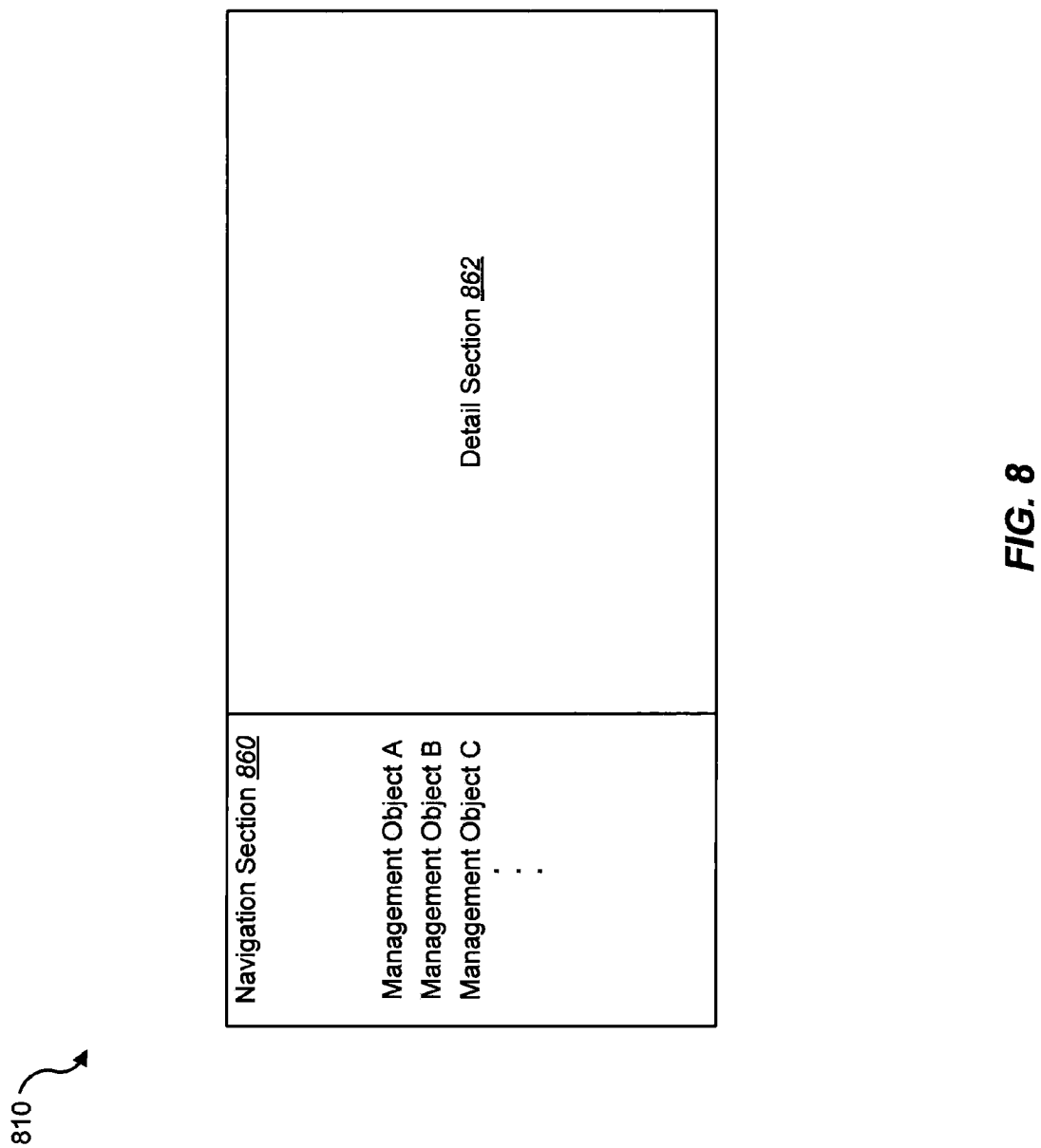
FIG. 8 is a block diagram illustrating one embodiment of a management object view in accordance with the present systems and methods.

FIG. 8 is a block diagram illustrating one embodiment of a management object view 810 in accordance with the present systems and methods. In one configuration the management object view 810 may be the view for management objects such as, but not limited to, job/tasks and policies. In one example, the management object view 810 may include a navigation section 860 and a detail section 862, as previously described.

As illustrated, the navigation section 860 may include a list of management objects, such as management object A, management object B, and management object C. When a particular management object is selected in the navigation section 860, details regarding the selected management object may be displayed in the detail section 862. A user may select a management object by using an electronic pointing device (such as a mouse) to grab a particular management object.

Figure 9:
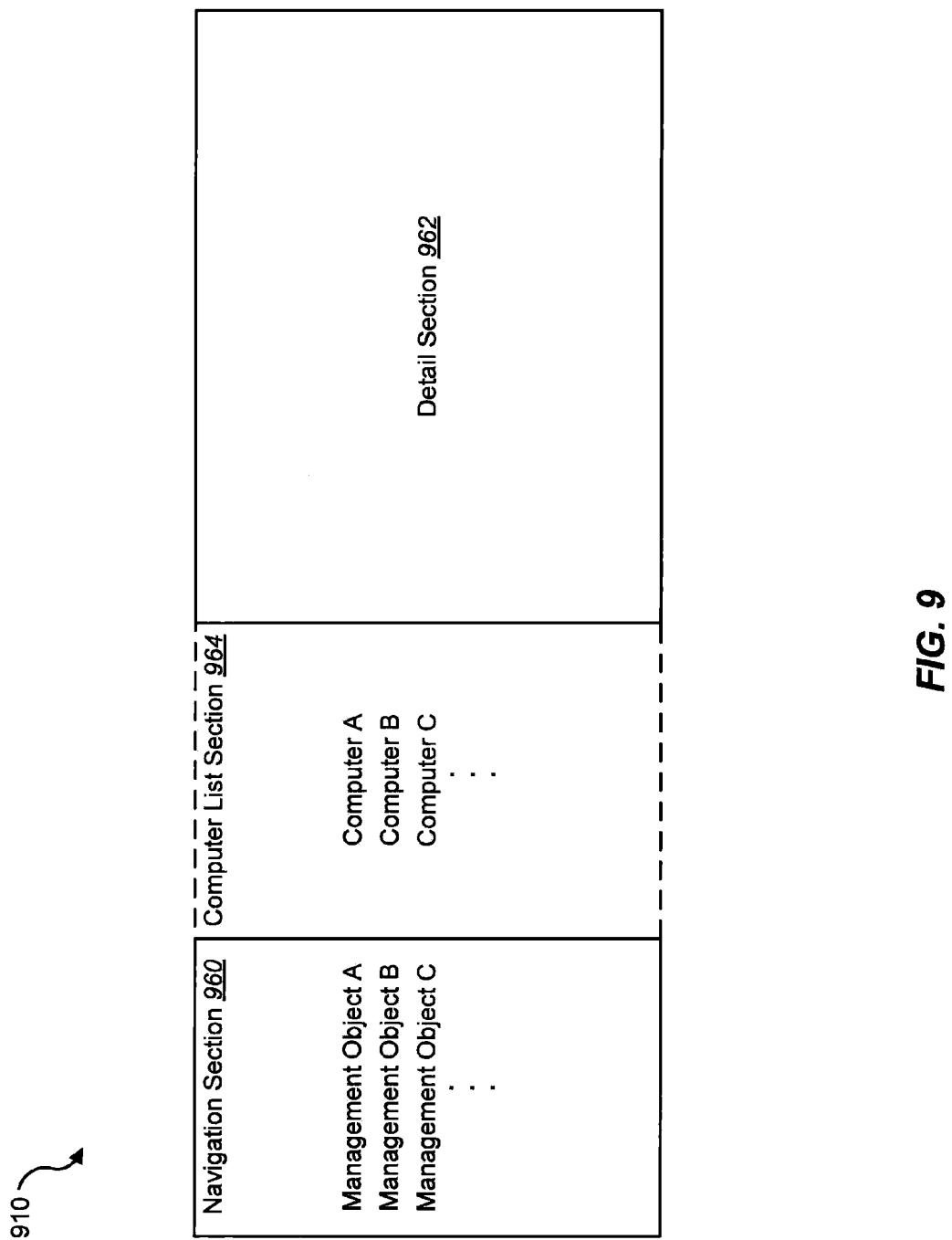
FIG. 9 is a block diagram illustrating a further embodiment of a management object view in accordance with the present systems and methods.

FIG. 9 is a block diagram illustrating a further embodiment of a management object view 910 in accordance with the present systems and methods. As previously stated, the view 910 may include a navigation section 960 that lists various management objects and a detail section 962 that includes details regarding an object selected from the navigation section 960.

The view 910 also illustrates what occurs when a particular management object is selected in the navigation section 960. For example, a user may select management object A in the navigation section 960 by grabbing the object using an electronic pointing device. When management object A is grabbed, a computer list section 964 may be automatically displayed between the navigation section 960 and the detail section 962. In other words, the detail section 962 may be pushed over and the computer list section 964 may be displayed between the two sections 960, 962. The computer list section 964 may include a list of the most recently viewed computing devices. In this example, the computer list section 964 may include computer A, computer B, and computer C. The user may drag and drop management object A onto one or more of the computing devices listed in the computer list section 964. When the user ceases the drag and drop action, the computer list section 964 may no longer be displayed to the user and the detail section 962 may return to be displayed adjacent to the navigation section 960.

Figure 10:
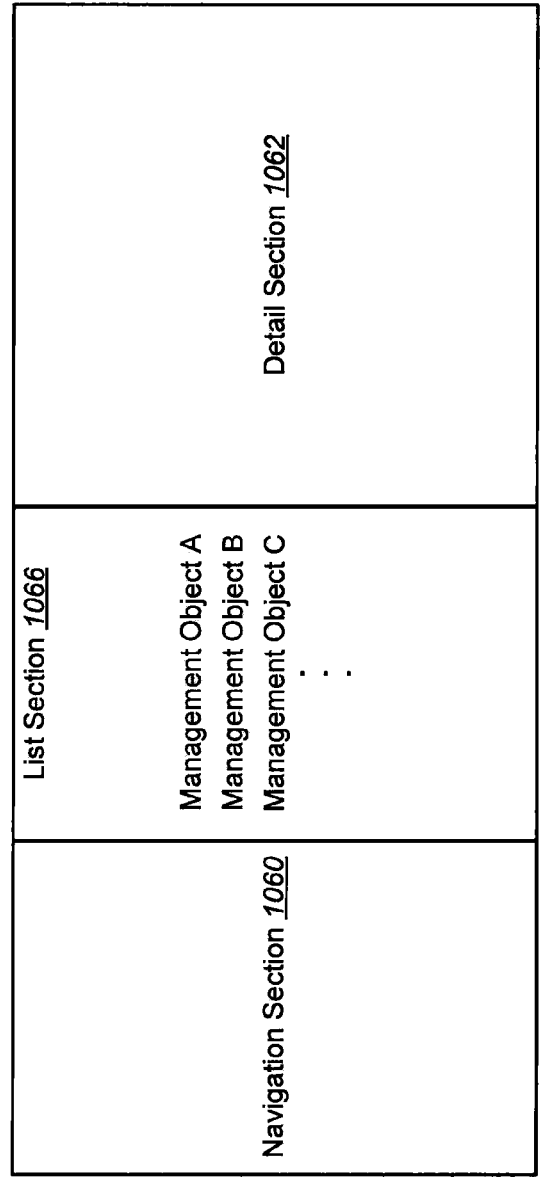
FIG. 10 is a block diagram illustrating one embodiment of a management object view in accordance with the present systems and methods.

FIG. 10 is a block diagram illustrating one embodiment of a management object view 1010 in accordance with the present systems and methods. In one configuration the management object view 1010 may be the view for management objects such as, but not limited to, software packages. In one example, the management object view 1010 may include a navigation section 1060, a list section 1066, and a detail section 1062, as previously described.

As illustrated, the list section 1066 may include a list of management objects, such as management object A, management object B, and management object C. When a particular management object is selected in the list section 1066, details regarding the selected management object may be displayed in the detail section 1062. A user may select a management object by using an electronic pointing device (such as a mouse) to grab a particular management object.

Figure 11:
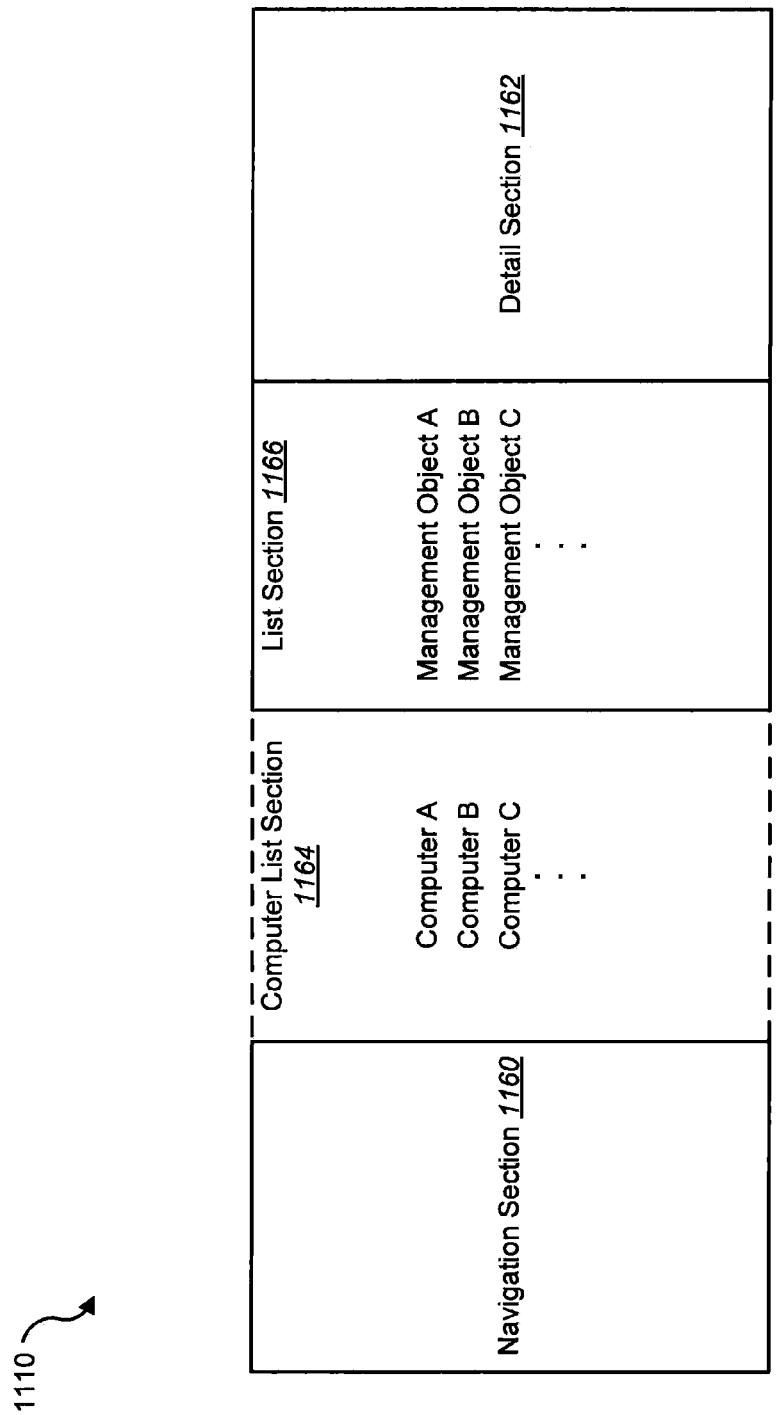
FIG. 11 is a block diagram illustrating a further embodiment of a management object view in accordance with the present systems and methods.

FIG. 11 is a block diagram illustrating a further embodiment of a management object view 1110 in accordance with the present systems and methods. As previously stated, the view 1110 may include a navigation section 1160, a list section 1166 that lists various management objects, and a detail section 1162 that includes details regarding an object selected from the list section 1166.

The view 1110 also illustrates what occurs when a particular management object is selected in the list section 1166. For example, a user may select management object A in the list section 1166 by grabbing the object using an electronic pointing device. When management object A is grabbed, a computer list section 1164 may be automatically displayed between the navigation section 1160 and the list section 1166. In other words, the list section 1164 and the detail section 1162 may be pushed over and the computer list section 1164 may be displayed between the navigation section 1160 and the list section 1166. The computer list section 1164 may include a list of the most recently viewed computing devices. In this example, the computer list section 1164 may include computer A, computer B, and computer C. The user may drag and drop management object A onto one or more of the computing devices listed in the computer list section 1164. When the user ceases the drag and drop action, the computer list section 1164 may no longer be displayed to the user and the list section 1166 may return to be displayed adjacent to the navigation section 1160.

Figure 12:
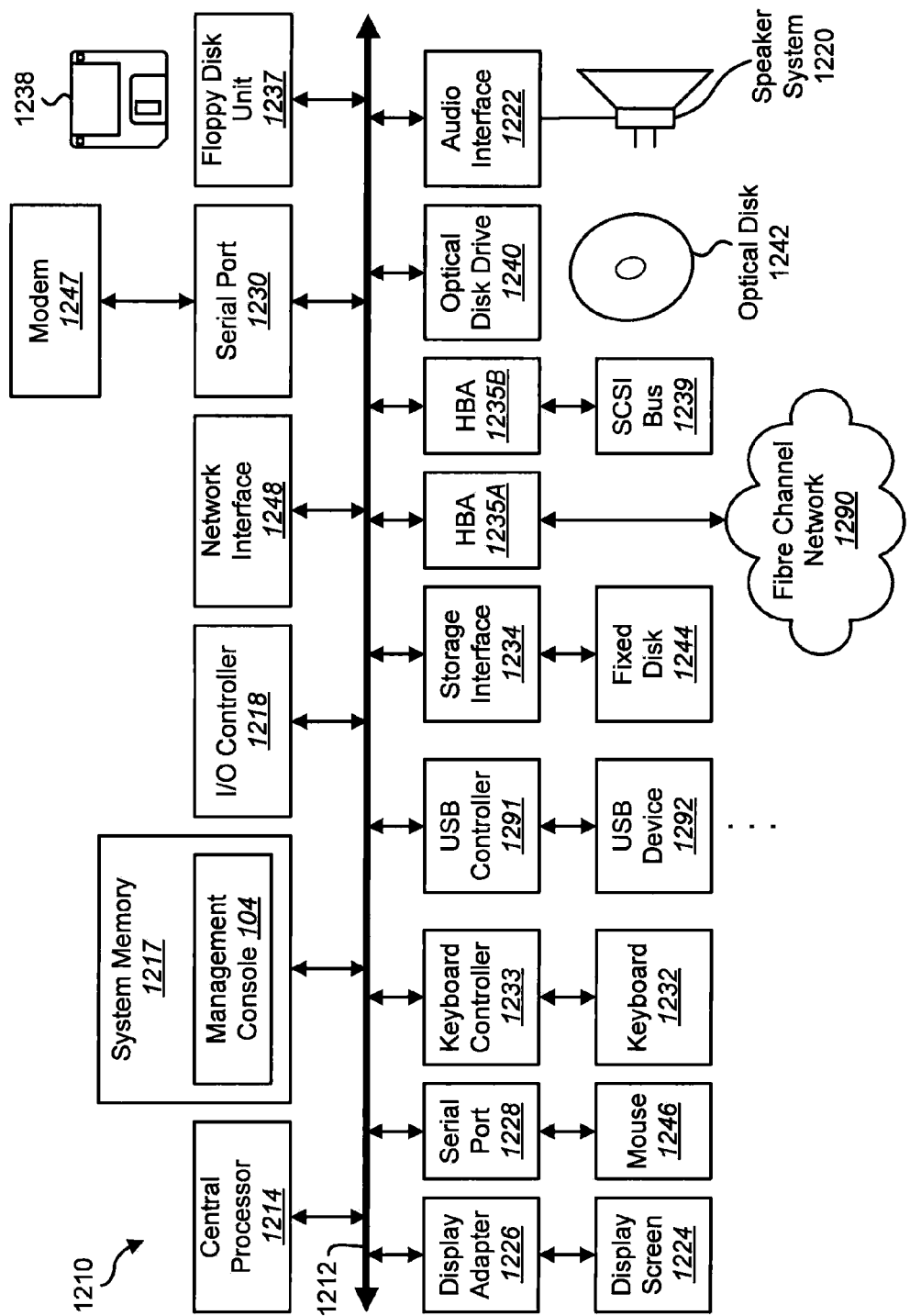
FIG. 12 depicts a block diagram of a computer system suitable for implementing the present systems and methods.

FIG. 12 depicts a block diagram of a computer system 1210 suitable for implementing the present systems and methods. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), multiple USB devices 1292 (interfaced with a USB controller 1290), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the management console 104 to implement the present systems and methods may be stored within the system memory 1217. Applications resident with computer system 1210 are generally stored on and accessed via a computer readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present systems and methods. The devices and subsystems can be interconnected in different ways from that shown in FIG. 12. The operation of a computer system such as that shown in FIG. 12 is readily known in the art and is not discussed in detail in this application. Code to implement the present disclosure can be stored in computer-readable medium such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
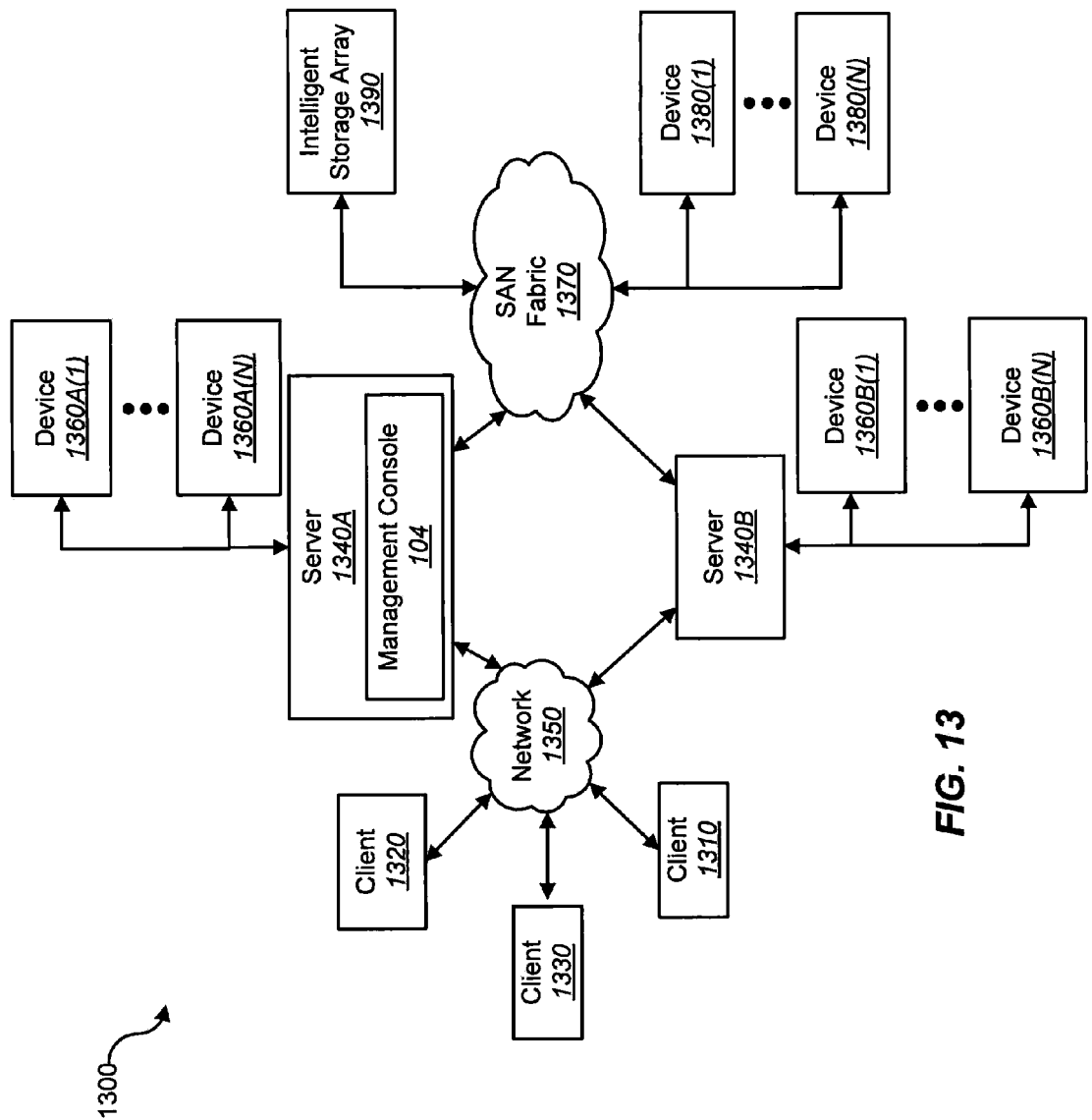
FIG. 13 is a block diagram depicting a network architecture in which client systems, as well as storage servers (any of which can be implemented using computer system), are coupled to a network.

FIG. 13 is a block diagram depicting a network architecture 1300 in which client systems 1310, 1320 and 1330, as well as storage servers 1340A and 1340B (any of which can be implemented using computer system 1310), are coupled to a network 1350. In one embodiment, the management console 104 may be located within a server 1340A, 1340B to implement the present systems and methods. The storage server 1340A is further depicted as having storage devices 1360A (1)-(N) directly attached, and storage server 1340B is depicted with storage devices 1360B(1)-(N) directly attached. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320, and 1330 to network 1350. Client systems 1310, 1320, and 1330 are able to access information on storage server 1340A or 1340B using, for example, a web browser or other client software (not shown). Such a client allows client systems 1310, 1320, and 1330 to access data hosted by storage server 1340A or 1340B or one of storage devices 1360A (1)-(N), 1360B(1)-(N), 1380(1)-(N) or intelligent storage array 1390. FIG. 13 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to display a dynamic list of computing devices in a graphical user interface (GUI) management console, comprising:
    displaying at least a first section of the GUI management console, wherein the first section includes a management object, the management object comprising an operation performed in relation to computing devices;
    displaying at least a second section of the GUI management console adjacent to the first section;
    detecting an activity relating to the management object;
    upon detecting the activity relating to the management object, displaying a third section in the GUI management console, wherein one or both of the first section and the second section is moved within the GUI management console and the third section is automatically displayed within the GUI management console between the first section and the second section;
    upon moving one or both of the first and second sections within the GUI management console, displaying a dynamic list of computing devices in the third section of the GUI management console, wherein the computing devices are possible recipients of the management object;
    determining when the activity relating to the management object is terminated; and
    upon detecting the termination of the activity relating to the management object, terminating the display of the dynamic list of computing devices and moving the at least a portion of the interface back to the first position on the screen.

2. The method of claim 1, wherein the activity relating to the management object comprises a drag and drop action.

3. The method of claim 1, wherein the management object comprises a job to be implemented by a computing device.

4. The method of claim 1, wherein the management object comprises a policy to be implemented by a computing device.

5. The method of claim 1, wherein the management object comprises a software package to be downloaded by a computing device.

6. The method of claim 1, wherein the activity relating to the management object comprises grabbing the management object via an electronic pointing device.

7. The method of claim 1, wherein the dynamic list of computing devices comprises the computing devices previously accessed by a user in a previously terminated activity related to the management object.

8. A computing device configured to display a dynamic list of computing devices, comprising:
    a processor;
    memory in electronic communication with the processor;
    instructions stored in the memory, the instructions being executable by the processor to:
        display at least a first section of the GUI management console, wherein the first section includes a management object, the management object comprising an operation performed in relation to computing devices;
        display at least a second section of the GUI management console adjacent to the first section;
        detect an activity relating to the management object;
        upon detecting the activity relating to the management object, display a third section in the GUI management console, wherein one or both of the first section and the second section is moved within the GUI management console and the third section is automatically displayed within the GUI management console between the first section and the second section;
        upon moving one or both of the first and second sections within the GUI management console, display a dynamic list of computing devices in the third section of the GUI management console, wherein the computing devices are possible recipients of the management object;
        determine when the activity relating to the management object is terminated; and
        upon detecting the termination of the activity relating to the management object, terminate the display of the dynamic list of computing devices and move the at least a portion of the interface back to the first position on the screen.

9. The computing device of claim 8, wherein the activity relating to the management object comprises a drag and drop action.

10. The computing device of claim 8, wherein the management object comprises a job to be implemented by a computing device.

11. The computing device of claim 8, wherein the management object comprises a policy to be implemented by a computing device.

12. The computing device of claim 8, wherein the management object comprises a software package to be downloaded by a computing device.

13. The computing device of claim 8, wherein the activity relating to the management object comprises grabbing the management object via an electronic pointing device.

14. The computing device of claim 8, wherein the dynamic list of computing devices comprises the computing devices previously accessed by a user.

15. The computing device of claim 8, wherein the instructions are executable by the processor to:
    push over a section associated with a management object to display the dynamic list of virtual objects.

16. A computer-program product for displaying a dynamic list of virtual objects, the computer-program product comprising a non-transitory computer-readable medium storing instructions thereon, the instructions being executable by a processor to:
    display at least a first section of the GUI management console, wherein the first section includes a management object, the management object comprising an operation performed in relation to computing devices;
    display at least a second section of the GUI management console adjacent to the first section;
    detect an activity relating to the management object;
    upon detecting the activity relating to the management object, display a third section in the GUI management console, wherein one or both of the first section and the second section is moved within the GUI management console and the third section is automatically displayed within the GUI management console between the first section and the second section;

upon moving one or both of the first and second sections within the GUI management console, display a dynamic list of computing devices in the third section of the GUI management console, wherein the computing devices are possible recipients of the management object;

determine when the activity relating to the management object is terminated; and upon detecting the termination of the activity relating to the management object, terminate the display of the dynamic list of computing devices and move the at least a portion of the interface back to the first position on the screen.

17. The computer-program product of claim 16, wherein the activity relating to the management object comprises a drag and drop action.

\* \* \* \* \*